United States Patent Office 3,020,291
Patented Feb. 6, 1962

3,020,291
PROCESS FOR PREPARING 2-METHYLFURAN
Andrew P. Dunlop, Riverside, and Donald G. Manly, Barrington, Ill., assignors to The Quaker Oats Company, Chicago, Ill., a corporation of New Jersey
No Drawing. Filed Dec. 13, 1957, Ser. No. 702,515
3 Claims. (Cl. 260—346.1)

This invention relates to an improved process for producing 2-methylfuran from furfuryl alcohol. More specifically it relates to a process for producing 2-methylfuran by treating furfuryl alcohol in the vapor phase with gaseous hydrogen in contact with a catalyst.

Methylfuran has been produced by the hydrogenolysis of furfuryl in the presence of various metal oxide catalysts. Although some of the yields reported with these catalysts have been fairly high, it has been found that the product is somewhat impure. If yields are determined by vapor phase chromatography, which is qualitative as well as quantitative, they are found to be considerably lower than those reported.

Methylfurfan has also been produced from furfuryl alcohol employing copper-chromate-alkaline-earth-metal catalysts. However, in this case even the reported yields are considerably less than quantitative.

One of the objects of the invention is to produce methylfuran from furfuryl alcohol with substantially quantitative yields.

Another object of the invention is to provide a process for producing methylfuran from furfuryl alcohol whereby the rate of conversion is of a high order.

A further object of the invention is to provide a process for producing methylfuran which makes possible the use of the same catalyst over a long period of time without regeneration.

In accordance with the invention these objects are accomplished by contacting furfuryl alcohol in the vapor phase with hydrogen at an elevated temperature in the presence of a copper chromite catalystw hich has been reduced under carefully controlled conditions.

The catalyst employed preferably is substantially pure copper chromite in which the ratio by weight of copper to chromium, prior to reduction, is less than 94:6 and more than 50:50 calculated as $CuO:Cr_2O_3$. The catalyst may be in the form of pellets, pellet particles, or may be deposited on a carrier. Prior to use, the catalyst is reduced in hydrogen at a temperature below about 250° C.

In converting furfuryl alcohol to methylfuran according to the invention in the presence of the aforedescribed catalyst a temperature is required between about 100° C. and about 300° C., preferably between about 150° C. and about 220° C. Hydrogen is supplied to the reaction in stoichiometric excess, preferably a molar ratio of hydrogen to furfuryl alcohol of more than 3:1, or more desirably, greater than 10:1. The furfuryl alcohol is preferably entrained in the hydrogen as a vapor and supplied to a bed of the catalyst at feed rate of 0.03–0.3 part by weight furfuryl alcohol per hour per part by weight catalyst. The reaction is conducted under atmospheric pressure although pressures as high as three atmospheres may also be employed. The reaction product vapors from the catalyst bed are condensed to recover nearly quantitative yields of methylfuran and a minor amount of unconverted furfuryl alcohol which is easily separated, as by distillation and which may be recycled to the reaction process.

A preferred procedure for the prior reduction of the catalyst is as follows: Copper chromite, desirably having a copper to chromium ratio within the aforedescribed limits, is heated to about 140° C. under a nitrogen or other inert atmosphere. Hydrogen is slowly added to the system at such a rate as to avoid the build-up of temperatures above 250° C. within the catalyst bed. The gas flowing over the catalyst bed is gradually enriched with hydrogen as the temperature is slowly raised to 200° C. At this temperature the gas should be pure hydrogen. It is held at this temperature until no further formation of water of reduction is observed.

The invention will be further illustrated but is not limited by the following examples in which quantities of reactants are in parts by weight unless otherwise indicated. Yields of the product were calculated from analytical data obtained by vapor phase chromatography.

Example 1

Copper chromite pellets having a ratio by weight of $CuO:Cr_2O_3$ of 80:20 were reduced according to the following procedure: About 315 parts of the pellets were charged to a jacketed, steel reactor tube included in a hermetically-joined system comprising a recycle compressor, flowmeter, preheater, reactor tube, condenser and product tank. The entire system was thoroughly flushed with nitrogen to purge it of any oxygen. The system was then pressurized with nitrogen and valves adjusted to obtain a flow of about 1500 parts of the gas per minute with compressor intake and discharge pressure of about 4 and 8 p.s.i.g. respectively. The preheater was adjusted to obtain a gas temperature of about 170° C. in the catalyst charge (catalyst bed). Hydrogen was then fed into the circulating nitrogen stream at a rate of about 50 parts per minute. After about 428 parts of water had condensed and collected in the product tank, the system was thoroughly flushed with hydrogen to purge the system of nitrogen. The temperature of the hydrogen gas flowing through the catalyst bed was then gradually raised to about 225° C. over a period of about one hour and held at that temperature for an additional hour. An additional 2.3 parts of water were condensed and collected.

After reduction of the catalyst as described above, furfuryl alcohol was vaporized into a stream of preheated hydrogen and passed through the catalyst bed. The feed rate was about 0.04 part furfuryl alcohol per hour per part of catalyst. A molar ratio of hydrogen:furfuryl alcohol of about 50:1 and a catalyst bed temperature of about 160° C. was maintained. The pressure on the system was 0–10 lbs. per square inch guage. The product gases were passed through a condenser and the resulting condensate purified by distillation to give methylfuran of 99% purity. The yield of methylfuran, based on furfuryl alcohol reacted was 97% of theoretical. The percentage of furfuryl alcohol converted was 99%. Substantially the same yields and conversion were obtained throughout over 5000 hours use of the catalyst (or 200 parts furfuryl alcohol per part catalyst), and at the end of this period there was no indication of any inactivation.

Example 2

The procedure of Example 1 was repeated with the following exceptions: (1) a glass reactor tube was employed, (2) the temperature of the catalyst bed was 215° C., (3) the feed rate was 0.19 part furfuryl alcohol per hour per part of catalyst, (4) the molar ratio of hydrogen to furfuryl alcohol was 10:1, and (5) the catalyst had a ratio by weight of $CuO:Cr_2O_3$ of 52:48. The yield of methylfuran was 94% of theoretical. The percentage of furfuryl alcohol converted was 100%.

Example 3

The procedure of Example 2 was repeated with the following exceptions: (1) the catalyst had a ratio by weight of $CuO:Cr_2O_3$ of 94:6, and (2) the molar ratio of hydrogen to furfuryl alcohol was 8:1. The yield of methylfuran was 88% of theoretical. The percentage of furfuryl alcohol converted was 99%.

*Example 4*

The procedure of Example 1 was repeated with the following exceptions: (1) a glass reactor tube was employed, (2) the temperature of the catalyst bed was 200° C., (3) the feed rate was 0.19 part furfuryl alcohol per hour per part of catalyst, and (4) the molar ratio of hydrogen to furfuryl alcohol was 10:1. At the end of a 10 hour period the yield of methylfuran was 95.8% of theoretical, and the percentage of furfuryl alcohol converted was 100%.

*Example 5*

The procedure of Example 4 was repeated with the exception that the catalyst was not reduced prior to use. When furfuryl alcohol and hydrogen were passed through the catalyst bed, a red-hot zone appeared which slowly moved through the bed. The product was about 90% water during the presence of the hot zone which persisted for about 3¾ hours. When the hot zone had passed, methylfuran was obtained in 95.6% yield and 53.3% conversion. After an addition 2¼ hours the yield had dropped to 94.9% and the conversion to 51.2%.

Example 5 illustrates that it is essential to reduce the copper chromite catalyst prior to use according to the invention. If the catalyst is not so reduced, the percent furfuryl alcohol converted to methylfuran will be unsatisfactory. Furthermore, catalyst life will be shorter as reflected by decreasing yields and conversions.

From Examples 1 to 4 it is apparent that the invention advances the art of producing methylfuran to a considerable degree. The furfuryl alcohol starting material is almost completely converted in a single pass over the catalyst; the yield of methylfuran is substantially quantitative; and of further importance, the catalyst may be employed over an unusually long period of time without regeneration or replacement.

We claim:
1. In a process for producing 2-methylfuran in which furfuryl alcohol in the vapor phase is contacted with hydrogen at a temperature between about 100° C. and about 300° C. in the presence of a catalyst, the improvement wherein said catalyst consists essentially of copper chromite catalyst which has been pre-reduced by contact with hydrogen gas at a temperature below about 250° C. prior to initial contact with the furfuryl alcohol vapors.

2. A process according to claim 1 wherein said copper chromite catalyst has a ratio by weight of $CuO:Cr_2O_3$ prior to reduction of less than 94:6 and more than 50:50.

3. A process according to claim 1 wherein said copper chromite catalyst has been reduced at a temperature between about 140° C. and about 200° C. and has a ratio by weight of $CuO:Cr_2O_3$ prior to reduction of about 80:20.

References Cited in the file of this patent

UNITED STATES PATENTS

| | | |
|---|---|---|
| 2,445,714 | Holdren | July 20, 1948 |
| 2,458,001 | Johns | Jan. 4, 1949 |
| 2,458,857 | John et al. | Jan. 11, 1949 |

FOREIGN PATENTS

| | | |
|---|---|---|
| 634,079 | Great Britain | Mar. 15, 1950 |

OTHER REFERENCES

Marek and Hahn: Catalytic Oxidation of Organic Compounds in the Vapor Phase (1932) (Chemical Catalog Co., Inc., Pub.), page 84.

Adkins: Reactions of Hydrogen With Organic Compounds Over Copper-Chromium Oxide and Nickel Catalysts (1946), pages 12–14.

Burnette et al.: Ind. and Engr. Chem., vol. 40, pages 502–5 (1947).

Schniepp et al.: J.A.C.S., vol. 69, pages 672–74 (1947).